(12) United States Patent
Rasanen

(10) Patent No.: US 9,554,401 B2
(45) Date of Patent: Jan. 24, 2017

(54) METHOD AND APPARATUSES FOR MULTIMEDIA PRIORITY SERVICE

(75) Inventor: Juha Antero Rasanen, Espoo (FI)

(73) Assignee: NOKIA SOLUTIONS AND NETWORKS OY, Espoo (FI)

( * ) Notice: Subject to any disclaimer, the term of this patent is extended or adjusted under 35 U.S.C. 154(b) by 52 days.

(21) Appl. No.: 13/997,287

(22) PCT Filed: Nov. 1, 2011

(86) PCT No.: PCT/EP2011/069183
§ 371 (c)(1),
(2), (4) Date: Jun. 24, 2013

(87) PCT Pub. No.: WO2012/089368
PCT Pub. Date: Jul. 5, 2012

(65) Prior Publication Data
US 2013/0273876 A1    Oct. 17, 2013

(30) Foreign Application Priority Data
Dec. 30, 2010    (WO) ................. PCT/EP2010/070928

(51) Int. Cl.
*H04W 76/00*    (2009.01)
*H04M 3/42*    (2006.01)
(Continued)

(52) U.S. Cl.
CPC ........ *H04W 76/007* (2013.01); *H04L 65/1016* (2013.01); *H04L 65/1096* (2013.01);
(Continued)

(58) Field of Classification Search
CPC ............. H04L 41/0893; H04L 65/1016; H04L 41/5029; H04L 47/786; H04L 12/14; H04L 12/1407; H04L 47/805; H04L 47/821; H04L 41/5032; H04L 63/20; H04L 67/322; H04L 47/2408; H04W 4/24; H04W 12/06; H04W 76/007; H04W 72/1247
See application file for complete search history.

(56) References Cited

U.S. PATENT DOCUMENTS

2007/0286138 A1* 12/2007 Kaftan ........................ 370/338
2008/0248807 A1* 10/2008 Kim et al. .................... 455/453
(Continued)

FOREIGN PATENT DOCUMENTS

WO    WO 2008/055541 A1    5/2008

OTHER PUBLICATIONS

International Search Report and Written Opinion dated Mar. 5, 2012 corresponding to Internationa Patent Application No. PCT/EP2011/069183.
(Continued)

*Primary Examiner* — Liton Miah
(74) *Attorney, Agent, or Firm* — Squire Patton Boggs (US) LLP

(57) ABSTRACT

The invention relates to an apparatus and method for transmitting a request to control a multimedia priority service for a user from user equipment to a subscription profile repository, comprising transmitting the request from the user equipment to an intermediate node, and transmitting the request from the intermediate node to a subscription profile repository.

18 Claims, 5 Drawing Sheets

(51) Int. Cl.
*H04M 3/51* (2006.01)
*H04L 29/06* (2006.01)
*H04M 7/00* (2006.01)

(52) U.S. Cl.
CPC ........ *H04L 65/80* (2013.01); *H04M 3/42153* (2013.01); *H04M 3/5116* (2013.01); *H04M 7/006* (2013.01)

(56) References Cited

U.S. PATENT DOCUMENTS

| | | | | |
|---|---|---|---|---|
| 2008/0253390 | A1* | 10/2008 | Das et al. | 370/465 |
| 2009/0122701 | A1* | 5/2009 | Goldman et al. | 370/232 |
| 2009/0196213 | A1* | 8/2009 | Zhong | H04W 36/06 370/312 |
| 2010/0034367 | A1* | 2/2010 | Das et al. | 379/202.01 |
| 2011/0047241 | A1* | 2/2011 | Wang | 709/217 |

OTHER PUBLICATIONS

3GPP TSG SA WG2 Meeting #79E (Electronic), Jul. 6-13, 2010, Elbonia; Jul. 6, 2010, Jul. 15, 2010, XP050458287, TD S2-103217 (Revision 4 of S2-103140); Priority service for data services, Verizon et al, 2 pages.

3GPP TS 23.203 V11.0.0 (Dec. 2010); 3rd Generation Partnership Project, Technical Specification Group Services and System Aspects, Policy and charging control architecture (Release 11), 137 pages.

3GPP TS 23.402 V10.2.0 (Dec. 2010) 3GPP, Technical Specification Group Services and System Aspects, Architecture enhancements for non-3GPP accesses (Release 10), 228 pages.

3GPP TS 22.153 V10.1.0 (Sep. 2010); 3GPP, Technical Specification Group Services and System Aspects, Multimedia priority service (Release 10), 9 pages.

3GPP TS 29.214 V10.0.1 (Sep. 2010); 3GPP, Technical Specification Group Core Network and Terminals, Policy and Charging Control over Rx reference point (Release 10), 46 pages.

3GPP TS 23.401 V10.1.0 (Sep. 2010) Technical Specification 3rd Generation Partnership Project; Technical Specification Group Services and System Aspects: General Packet Radio Service (CPRS) enhancements for Evolved Universal Terrestrial Radio Access Network (E-UTRAN) access (Release 10), Sep. 29, 2010, 271 pages.

3GPP TS 23.203 V10.1.0 (Sep. 2010) Technical Specification 3rd Generation Partnership Project: Technical Specification Group Services and System Aspects; Policy and charging control architecture (Release 10), 132 pages.

3GPP TS 29.212 V10 1 0 (Dec. 2010) Technical Specification 3rd Generation Partnership Project Technical Specification Group Core Network and Terminals; Policy and Charging Control over Gx reference point (Release 10), Jan. 7, 2011, 125 pages.

3GPP TS 29.213 V10 0 0 (Dec. 2010) Technical Specification 3rd Generation Partnership Project; Technical Specification Group Core Network and Terminals; Policy and Charging Control signalling flows and Quality of Service (QoS) parameter mapping (Release 10) , Jan. 7, 2011, 132 pages.

3GPP TS 24.008 V10.1.0 (Dec. 2010) Tethnical Specification 3rd Generation Partnership Project; Technical Specification Group Core Network and Terminals; Mobile radio interface Layer 3 specification; Core network protocols; Stage 3, (Release 10), Dec. 22, 2010, 625 pages.

3GPP TS 29.060 V10.0.0 (Dec. 2010) Technical Specification 3rd Generation Partnership Project; Technical Specification Group Core Network and Terminals; General Packet'Radio Service (GPRS); GPRS Tunnelling Protocol (GTP) across the GN and GP interface (Release 10), 162 pages.

3GPP TS 29.274 V10:1 0 (Dec. 2010) Technical Specification 3rd Generation Partnership Project; Technical Specification Group Core Network and Terminals; 3GPP Evolved Packet System (EPS); Evolved General Packet Radio Service (GPRS) Tunnelling Protocol for Control plane (GTPv2-C); Stage 3 (Release 10), 175 pages.

3GPP TS 24.229 V10.2.0 (Dec. 2010) Technical Specification 3rd Generation Partnership Project; Technical Specification Group Core Network and Terminals; IP multimedia call control protocol based on Session Initiation Protocol (SIP) and Session Description Protocol (SDP); Stage 3 (Release 10), 689 pages.

* cited by examiner

METHOD AND APPARATUSES FOR MULTIMEDIA PRIORITY SERVICE

TECHNICAL FIELD OF THE INVENTION

The present invention relates to a mechanism for multimedia priority service. In particular, the present invention is related to a method and apparatus for invocation and revocation a multimedia priority service by a user.

BACKGROUND OF THE INVENTION

Multimedia priority service (MPS) allows authorized users, for example members of the government and other public authorities, to obtain priority access to radio resources of a telecommunication network on a priority basis before other public land mobile network (PLMN) users. Priority access may be needed, when congestion is blocking session establishment attempts for example in emergency situations, such as earthquakes, floods. In emergency situations many users can try to reach their family over a phone, however, part of the telecommunication network infrastructure can be out of operation due to a catastrophe. The MPS can support priority access to resources on an "end-to-end" priority basis and can be used for voice, video as well as other data bearer services in the packet switched (PS) domain and the IP Multimedia Subsystem (IMS).

In the MPS, a user can receive priority treatment for reserving packet switched bearer resources which the user can use to initiate and use various multimedia services. However, inflexible control possibilities of the MPS can reduce the usability of the service.

SUMMARY OF THE INVENTION

The present invention provides an apparatus (for example UE), a method and a computer program product comprising transmitting a request to control a multimedia priority service for a user, wherein the request to control comprises a request to activate or inactivate the multimedia priority service for the user.

The transmitting can comprise transmitting the request in one of a session initiation protocol message and a bearer control message, and/or, request can comprise a request to activate or inactivate the multimedia priority service at a subscription profile repository.

Further, an apparatus (for example, P-CSCF, AF or packet data gateway), a method and a computer program product are provided, comprising receiving from a user a first request to control a multimedia priority service, and, transmitting to a policy and/or charging control function a second request to control the multimedia priority service for the user, wherein the first and the second request to control comprise a request to activate or inactivate the multimedia priority service for the user.

The apparatus, method and computer program product can comprise converting the first request to the second request.

The receiving can comprise receiving the first request in one of a session initiation protocol message and a bearer control message, and/or the transmitting can comprise transmitting the second request in a Diameter message.

Further, an apparatus (for example, policy and/or charging control function), a method and a computer program product are provided, comprising receiving a first request to control a multimedia priority service for a user, transmitting to a subscription profile repository a second request to control the multimedia priority service for the user, wherein the first and the second request to control comprise a request to activate or inactivate the multimedia priority service for the user.

The receiving can comprise to receive the request from a packet data gateway or a proxy call state control function, and/or, to receive according to Diameter protocol.

The apparatus, method and computer program product can comprise converting the first request to the second request.

The transmitting can comprise transmitting the second request in a message according to one of Diameter, lightweight directory access protocol (LDAP), simple object access protocol (SOAP) and remote authentication dial-in user service (RADIUS).

Further, an apparatus (for example, SPR and/or HSS), a method and a computer program product are provided, comprising receiving a request to control a multimedia priority service for a user, wherein the request to control comprise a request to activate or inactivate the multimedia priority service for the user, and controlling the multimedia priority service for the user based on the request.

The receiving can comprise receiving the request from a policy and/or charging control entity and/or the receiving can comprise receiving the request in a message according to one of Diameter, lightweight directory access protocol (LDAP), simple object access protocol (SOAP) and remote authentication dial-in user service (RADIUS).

The apparatus, method and computer program product can comprise checking if the user is authorized for the multimedia priority service, and/or the controlling can comprise controlling the multimedia priority service for the user only if the user is authorized for the multimedia priority service.

Further, an apparatus, a method and a computer program product are provided for transmitting a request to control a multimedia priority service for a user from user equipment to a subscription profile repository, comprising transmitting a request from the user equipment to a policy and/or charging control function via an intermediate node, and, transmitting the request from the policy and/or charging control function to a subscription profile repository.

The request can be transmitted from the user equipment to the intermediate node in a session initiation protocol message and the intermediate node can comprise one of an application function and a proxy call state control function.

The request can be transmitted from the user equipment to the intermediate node in a bearer control message and the intermediate node can comprise a packet data gateway, and/or request can be transmitted from the intermediate node to the policy and/or charging control function in a Diameter request, and/or, the request can be transmitted from the policy and/or charging control function to the subscription profile repository in a profile request for the user.

Further, an apparatus (for example, MME or SGSN), a method and a computer program product are provided, comprising receiving a first request to control a multimedia priority service for a user, and, transmitting to a subscription server (for example, HSS or SPR) a second request to control the multimedia priority service for the user, wherein the first and the second request to control comprise a request to activate or inactivate the multimedia priority service for the user.

The first request can be received over S1-MME or Iu signaling interface and/or the second request can be transmitted over S6a or S6d signaling interface.

Embodiments of the present invention may have one or more of following advantages:

Existing protocols of different legs are used by chaining the protocols to carry the activation/invocation and/or deactivation/revocation request from a UE to an SPR, thus eliminating a need to define a new control protocol between the UE and SPR and keeping the architecture simpler.

The use of dedicated message exchange between the UE and SPR can be avoided by using protocol messages that would anyway be exchanged between the related network elements for example for a session establishment or modification or termination, thus minimizing the impact on network performance and scalability.

For some protocols, existing parameter containers can be used, or possibly existing parameters with new values, thus keeping the protocols simpler and minimizing the impact on specifications and implementations when introducing the invocation and revocation of the on-demand MPS service.

DETAILED DESCRIPTION OF THE INVENTION

A mobility management entity (MME) is in the context of long-term evolution (LTE), a central control node that is responsible for managing and storing the user equipment and user identities, mobility state, security parameters, and the IP bearer status. The MME can, for example, authenticate the user, generate temporary identities, and allocate them to user equipment (UE). The MME can check whether the user equipment can camp on the tracking area or on the public land mobile network. The MME is a subcomponent of the evolved packet core (EPC).

Serving GPRS support node (SGSN) is a general packet radio service (GPRS) support node that serves GPRS mobile stations by sending or receiving packets via a base station subsystem or a radio access network. The SGSN is the basic element of the GPRS infrastructure. It can store for each mobile in its context different parameters used to route the packets, for example information about the mobile's location.

IP connectivity access network (IP-CAN) is set of network entities and interfaces that can provide connectivity for IP transport between UE and the IMS.

For example, a GPRS network can be used as an IP-CAN.

Universal mobile telecommunications system (UMTS) terrestrial radio access network (UTRAN) is radio access network (RAN) which consists of radio network controllers (RNC) and base transceiver stations (BTS) and which is located between the Iu interface and the wideband code division multiple access (WCDMA) radio interface.

Evolved node B (eNodeB) is a base transceiver station that can control all radio-related functions in the radio access part of the evolved UTRAN (E-UTRAN).

The eNodeB can support functions of a radio network such as radio bearer control, mobility management, admission control, and scheduling.

Figure 1:
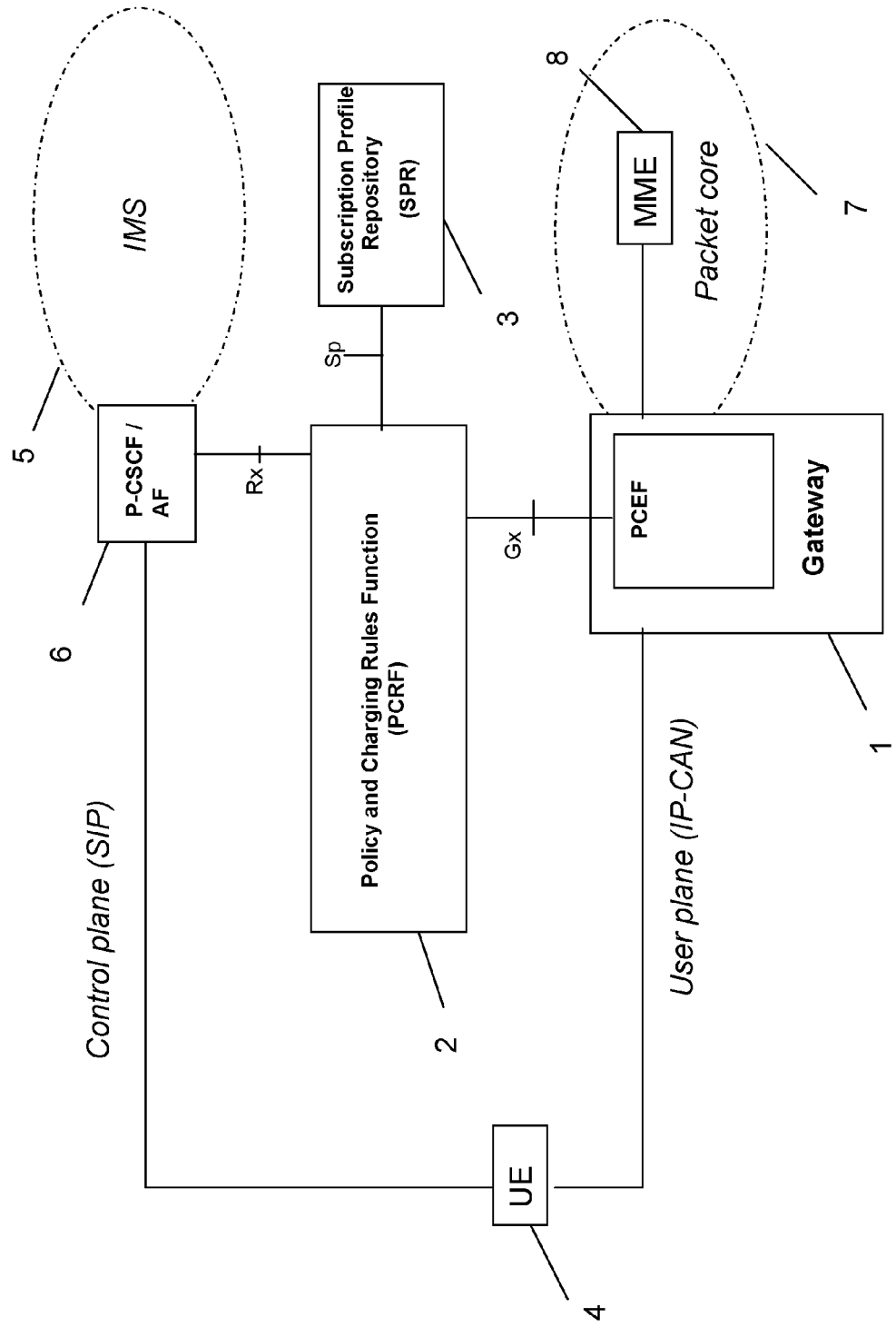
FIG. 1 illustrates architecture, network elements and interfaces relevant for the invention.

FIG. 1 shows architecture, network elements and interfaces relevant for the invention.

A packet data network gateway (P-GW, PDN gateway, PDN GW) 1 is a gateway that can provide a permanent IP-based point of attachment for access via the evolved UTRAN The packet data network gateway can implement a policy and charging enforcement function (PCEF) for packet flows both from and to UE 4.

A policy and charging rules function (PCRF) 2 is a function that defines and provides the policy and charging rules that are used in the policy enforcement points (1) for policy control and flow-based charging control. The PCRF 2 and PCEF 1 can communicate with each other over Gx reference point, which can be, for example Diameter based.

A subscription profile repository (SPR) 3 is a logical entity that contains subscriber and/or subscription related information that can be needed for subscription-based policies and IP CAN bearer level PCC rules by the PCRF 2. The SPR 3 can be combined with or distributed across other databases in the operator's network.

The SPR 3 can provide following subscription profile information, for example, per packet data network (PDN) which can be identified by the PDN identifier:

Subscriber's allowed services;
For each allowed service, a pre-emption priority;
Information on subscriber's allowed QoS, including the subscribed guaranteed bandwidth QoS;
Subscriber's charging related information (e.g. location information relevant for charging);
Subscriber's user CSG information reporting rules;
Subscriber category;
Subscriber's usage monitoring related information;
MPS EPS Priority and MPS Priority Level;
IMS Signalling Priority.
If the IMS signalling Priority is set, it can indicate that the IMS signalling bearer and the default bearer are assigned ARP appropriate for MPS at the time of Attach to IMS (i.e. APN dedicated to IMS) or establishment of PDN connection for IMS.

Different types of network entities and functions exist in the IMS network 5. Call Session Control Functions (CSCF) implement a session control function in SIP layer. The CSCF can act as Proxy CSCF (P-CSCF) 6, Serving CSCF (S-CSCF) or Interrogating CSCF (I-CSCF). The P-CSCF 6 is the first contact point for the User Equipment (UE) within the IMS and can act as an application function (AF) 6; the S-CSCF handles the session states in the network; the I-CSCF is mainly the contact point within an operator's network for all IMS connections destined to a subscriber of that network operator, or a roaming subscriber currently located within that network operator's service area.

An application function (AF) 6 is an element offering applications that can require dynamic policy and/or charging control over the IP CAN user plane. The AF 6 can communicate with a PCRF 2 to transfer dynamic session information, required for PCRF decisions as well as to receive IP CAN specific information and notifications about IP CAN bearer level events.

UE 4 can communicate with the IMS 5 via a P-CSCF 6 using Session Initiation Protocol (SIP). SIP is an application-layer control protocol for creating, modifying, and terminating sessions with one or more participants. These sessions may include Internet multimedia conferences, Internet telephone calls, and multimedia distribution. Members in a session can communicate via multicast or via a mesh of unicast relations, or a combination of these.

Multimedia priority service (MPS) has been defined by 3rd Generation Partnership Project (3GPP) and the MPS enables to deliver calls and complete sessions of a high priority from mobile to mobile networks, mobile to fixed networks, and fixed to mobile networks. Defined procedures allow invoking, modifying, maintaining and releasing sessions with priority, and delivery of priority media packets under network congestion conditions.

The MPS can be supported also in a roaming case when roaming agreements exist between service providers and where regulatory requirements apply.

A Service User is an individual who has received a priority level assignment from a regional/national authority, for example, an agency authorized to issue priority assignments, and has a subscription to a mobile network operator that supports the MPS feature.

A Service User obtains priority access to the Radio Access Network by using the Access Class Barring mechanism, which can provide preferential access based on UEs assigned Access Class if the Service User belongs to one of the special access-classes.

An MPS subscription can allow a user to receive priority services in the network which supports the MPS. The MPS subscription can entitle a UMTS subscriber identity module (USIM) with special Access Class(es) and can include indication for support of evolved packet system (EPS) bearer priority service, IMS priority service and circuit switched (CS) Fallback priority service support for the end user. The EPS is an evolution of the third generation network that is characterized by a higher-data-rate, lower-latency, packet-optimized system that supports multiple radio access technologies. Priority level regarding an EPS bearer and the IMS can also be part of the MPS subscription information.

A Service User can be treated as so-called "On Demand" MPS subscriber or not, based on, for example regional/national regulatory requirements. "On Demand" service is based on an explicit invocation/revocation of the Service User and can be applied to packet data network (PDN) connections for an access point name (APN). When the MPS is not used "On Demand" basis, the MPS service does not require a separate invocation from the Service User, but the MPS can provide priority treatment for all EPS bearers for a given Service User after UE's attachment to the EPS network.

When a mobility management entity (MME) receives and verifies mobile initiated signalling with establishment cause indicating a high priority access, the MME and evolved node B (eNodeB) can prioritize radio resource control (RRC) connection requests and establish the S1 bearer and radio resources with priority.

When a Service User requests an MPS session, the network can apply following bearer management principles:

EPS bearers (including default bearer) employed in an MPS session can be assigned an allocation and retention priority (ARP) value settings corresponding to the priority level of the Service User.

Setting ARP pre-emption capability and vulnerability for MPS bearers, subject to operator policies and depending on national/regional regulatory requirements.

Pre-emption of non-Service Users over Service Users during network congestion situation, subject to operator policy and national/regional regulations.

Priority treatment can be applicable to IMS based multimedia services, priority EPS bearer services (PS data without IMS interaction) and CS Fallback.

When a Service User invokes priority data bearer service for transport of data packets to and/or from the Service User, the network can give priority in admission of the priority data bearer and in packet data scheduling in the event of congestion, both for new sessions and also upgrade existing sessions.

A Service User can have capability to "on demand" priority treatment according to the user's MPS profile, which can be stored in a home subscriber server (HSS) or in the SRP. If the Service User is not authorized to use on-demand priority request, the Service User can receive priority treatment (i.e. appropriate ARP and QCI) at initial attach for all bearers, based on user profile data stored.

An On-Demand Service User requires explicit invocation/revocation via SPR MPS user profile update. Since MPS user profile is part of inputs for policy and charging control (PCC) rules, the update can trigger a PCC rules modification.

Subscription data for MPS can be provided to a PCRF through the Sp reference point. To support MPS service, the PCRF can subscribe to changes in the MPS subscription data for priority EPS bearer service. Dynamic invocation for MPS can be provided from an application function (AF) over Rx interface using a priority indicator.

For an MPS service, the PCRF can generate corresponding PCC/QoS rule(s) with the ARP and/or quality of service (QoS) class indicator (QCI) parameters, as appropriate for the prioritized service, for example for an IMS MPS.

For a non-MPS service, the PCRF can generate the corresponding PCC/QoS rule(s) as per normal procedures, without consideration whether the MPS priority EPS bearer service is active or not, but can upgrade the ARP/QCI values suitable for MPS if the priority EPS bearer service is invoked. The PCRF can change ARP/QCI values modified for priority EPS bearer service to an appropriate value according to PCRF decision.

Based on MPS EPS priority subscription, MME can verify whether the UE is permitted to initiate the RRC connection with higher priority and handle the request preferentially comparing to other UEs not prioritized.

An AF for MPS can be used to provide priority EPS bearer services using network-initiated resource allocation procedures (via interaction with PCRF) for originating accesses.

When a priority EPS bearer service is invoked, the PCRF can derive the corresponding PCC Rules with the ARP and QCI set as appropriate for a prioritized service. The PCRF can set the ARP and QCI of the default bearer as appropriate for a Priority EPS Bearer Service, and can set the ARP and QCI of PCC Rules installed before the activation of the priority EPS bearer service to the ARP and QCI as appropriate for the Priority EPS Bearer Service. The PCRF can provision the PCEF with the applicable PCC Rules upon priority EPS bearer service activation and deactivation.

Diameter is an authentication, authorisation, and accounting (AAA) protocol defined by the IETF and used for network access services, such as dial-up and mobile IP. The Diameter base protocol is evolved from the remote authentication dial-in user service (RADIUS) protocol.

Diameter multimedia client and Diameter multimedia server implement the Diameter multimedia application. The client is one of the communicating Diameter peers that usually initiates transactions.

Attribute-value pair (AVP) is a generic pair of values that consists of an attribute header and the corresponding value. The AVP can be used, for example, to encapsulate protocol-specific data such as routing information, as well as authentication, authorisation, or accounting information. Diameter messages can contain AVPs to transmit information, for example, between an AF/P-CSCF and PCRF, or between a PCRF and PCEF.

According to an aspect of the invention, a user/UE can send an MPS invocation or revocation request to the network within a service related protocol message, for example, as a dedicated MPS invocation or revocation parameter in the message or in a container of the message. Other service parameters and/or information may be included in the same message.

The receiving network entity can transmit the MPS invocation/revocation request, with the possible other service parameters/information, to a PCRF within a message exchange with the PCRF. The PCRF can transmit the MPS invocation/revocation request, with the possible other service parameters/information, to an SPR, for example, in a subscription profile request message.

According to an aspect of the invention, the SPR can respectively activate or deactivate the MPS service. The subscription related MPS service parameters may already be pre-configured in the SPR with the other subscription related user profile parameters. The PCRF can obtain the MPS service related parameters from the SPR and can use the parameters for producing relevant PCC/QoS rules.

Figure 2:
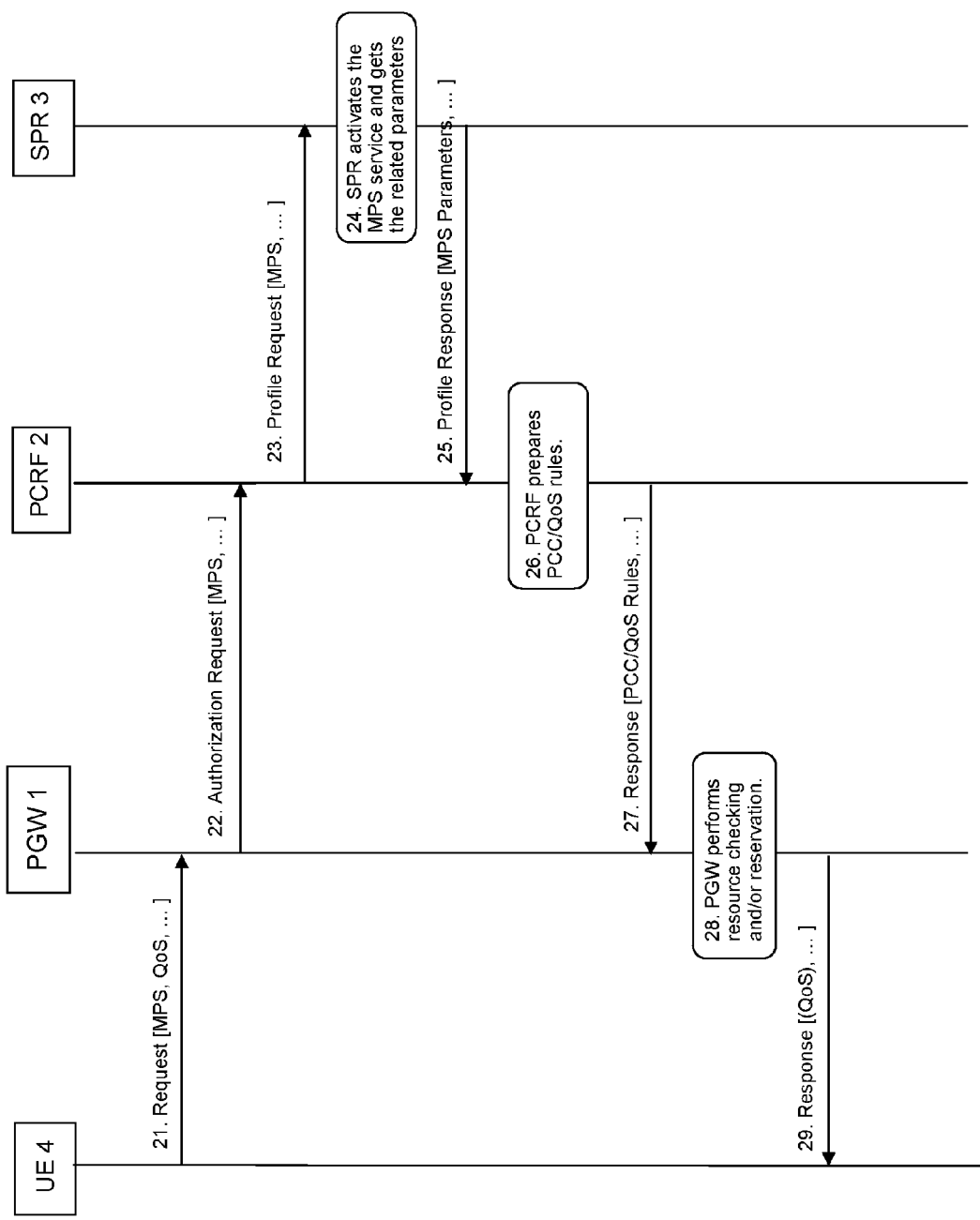
FIGS. 2 and 3 illustrate example signaling flows according to aspects of the invention.

According to an aspect of the invention, shown in FIG. 2, bearer level/control plane signaling (for example, mobile radio layer 3) can be used to transmit an MPS service related request from UE. The MPS service indication may be transported as a new value of an existing parameter or as a new parameter, for example, in Protocol Configuration Options (PCO) container. UE 4 can send a bearer modification or establishment request 21 to a PGW 1, including an indication or parameter to request an MPS invocation (or revocation). The PGW 1 can send a message 22, for example, a Diameter CC Request message, to a PCRF 2 to request authorization for the service data flows of the bearer modification or establishment. The PGW 1 can include an indication or parameter to request the MPS invocation (or revocation) in the request 22 to the PCRF 2. The PCRF 2 can request 23 a subscription profile of the user from a SPR 3. The PCRF 2 can include an indication or parameter to request the MPS invocation (or revocation) in the request 23 to the SPR 3. The SPR 3 can activate (or deactivate) 24 the MPS service and obtain related parameters and/or subscription profile, for example, from a HSS. The SPR 3 can send 25 the related parameters and/or subscription profile to the PCRF 2 in a response message. The PCRF 2 can use the parameters/subscription profile to create PCC/QoS rules 26. The PCRF 2 can send the PCC/QoS rules to the PGW 1 in a response message 27, for example, in a Diameter CC Answer message. The PGW 1 can perform resource checking and/or reservation 28 according to the received PCC/QoS rules. The PGW 1 can send 29 a response to the UE 4 and thus acknowledges the MPS service invocation (or revocation). The message may also include e.g. QoS parameters to indicate the negotiated QoS for the service.

Figure 3:
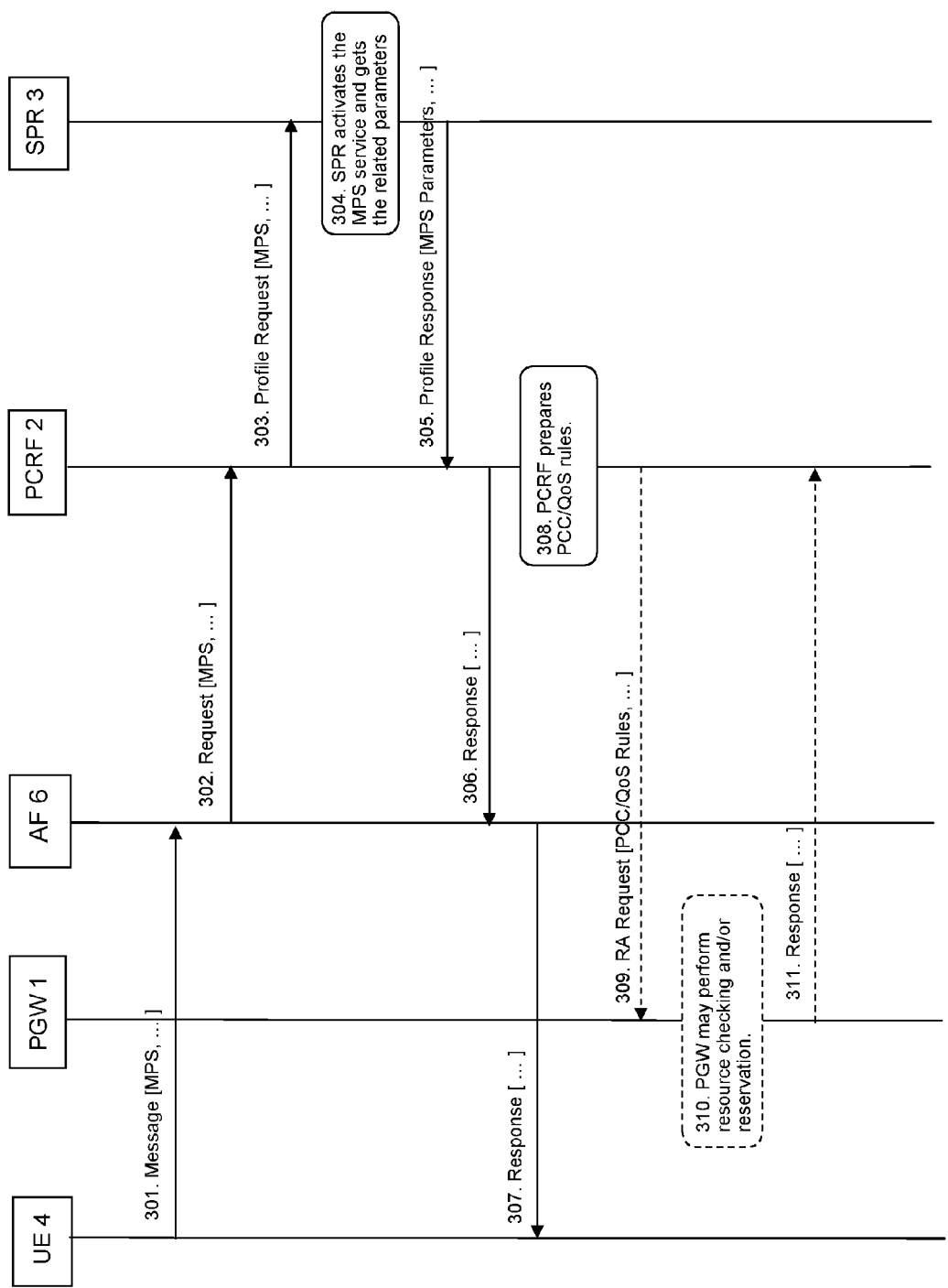

According to an aspect of the invention, shown in FIG. 3, signalling/session plane signalling, for example SIP, can be used to transmit an MPS service related request from UE. An MPS service related indication may be transported as a new value of an existing parameter (refer to e.g. ICSI/IMS Communication Service Identifier) or as a new parameter e.g. a SIP header.

UE 4 can send a session modification or establishment request 301, for example, a SIP INVITE or another SIP message to an AF/P-CSCF 6, including an indication or parameter to request an MPS invocation (or revocation).

The AF/P-CSCF 6 can send a message 302, for example, a Diameter AA Request message, to a PCRF 2. The AF/P-CSCF 6 can include an indication or parameter to request the MPS invocation (or revocation) in the request to the PCRF 2. The message may also include other parameters for an application/session modification or establishment. The PCRF 2 can request 303 a subscription profile of the user from the SPR 3. The PCRF 2 can include an indication or parameter to request the MPS invocation (or revocation) in the request 303 to the SPR 3. The SPR 3 can activate (or deactivate) 304 the MPS service and can obtain related parameters and/or subscription profile, for example, from a HSS. The SPR 3 can send 305 the related parameters and/or subscription profile to the PCRF 2 in a response message. The PCRF 2 can send a response 306 to the AF/P-CSCF 6 and can thus acknowledges the MPS service invocation or revocation. The AF/P-CSCF 6 can send a response 307 to the UE 4 and can thus acknowledges the MPS service invocation (or revocation).

The PCRF can use the parameters/subscription profile to create PCC/QoS rules. The PCRF 2 can transmit 309 PCC/QoS rules to a PGW 1, for example, in a Diameter RA Request message or in a response message to a separate request from the PGW 1. The PGW 1 can perform resource checking and/or reservation 310. The PGW 1 can send an indication 311 about the success of the resource operation to the PCRF 2.

According to an aspect of the invention, the invocation and revocation operations can be performed in conjunction with application and/or service session establishments and/or modifications and/or terminations without additional message exchange. According to an aspect of the invention, a message, for example, a default bearer modification message, can be sent only for the purpose of invoking or revoking an MPS service.

According to an aspect of the invention, an MPS parameter or parameter value for an existing parameter can be added for MPS service invocation/revocation either in the bearer level/control plane protocol or in the signaling/session plane protocol. The parameter/value can be added in relevant policy control interface Diameter protocols to get it carried to the SPR for the invocation/revocation of the MPS service.

According to an aspect of the invention, the "on demand" MPS service can be activated and deactivated by the service user. Currently there is no way for the user to invoke/revoke the service, i.e. activate/deactivate the service in the SPR.

Figure 5:
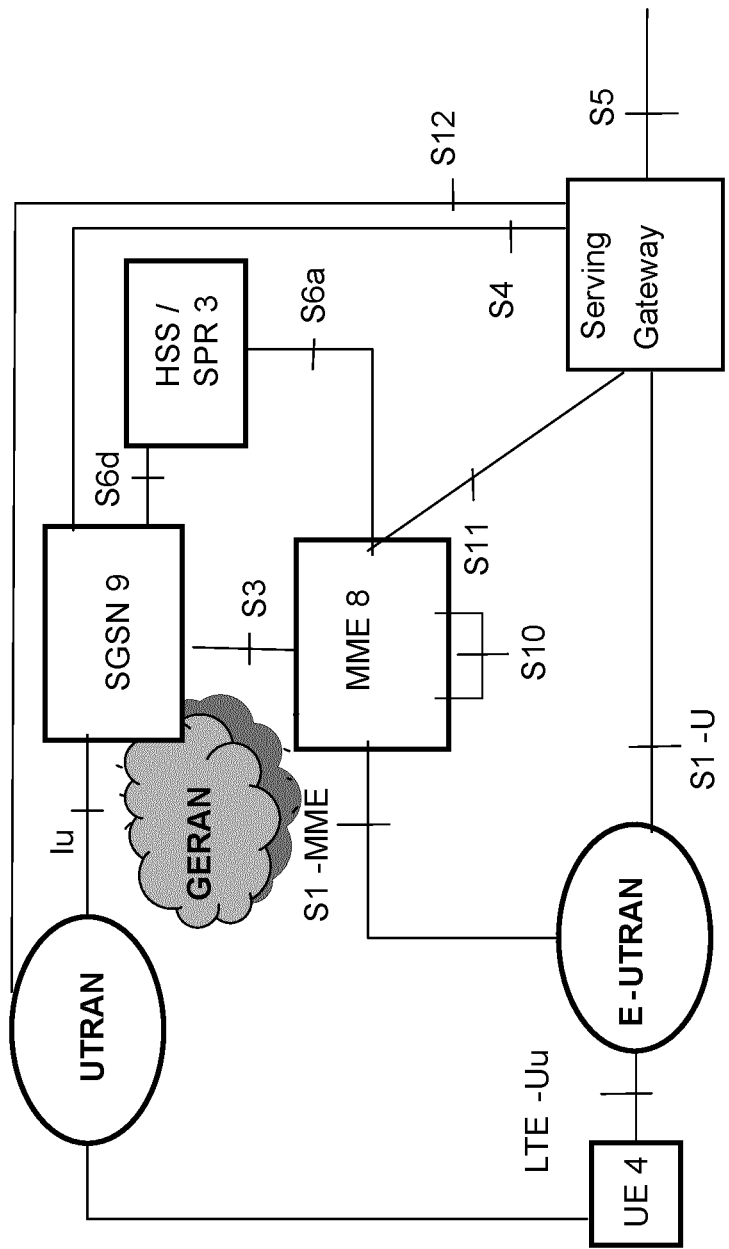
FIG. 5 illustrates architecture, network elements and interfaces relevant to an aspect of the invention.

SPR 3 functionality can be integrated with a HSS, which is the master database for a given user. The HSS can be used for keeping a list of features and services associated with a user, and for tracking the location of and means of access for its users. As shown in FIG. 5, the HSS/SPR 3 can interface an MME 8 (or an SGSN 9) over so called S6a reference point (S6d towards the SGSN 9), which can be Diameter based. The S6a/S6d interface enables transfer of subscription and authentication data for authenticating/authorizing user access to the (evolved) packet core between the MME 8/SGSN 9 and the HSS/SPR 3.

According to an aspect of the invention, an MME 8 can receive a request for an MPS invocation/revocation for a user in bearer level/control plane signaling, for example, over S1-MME interface from a control element of a radio access network. The S1-MME is a control plane protocol between an evolved radio access network (E-UTRAN) and the MME 8. Based on the received MPS invocation/revocation, the MME 8 can transmit a corresponding request to the HSS/SPR 3.

According to an aspect of the invention, an SGSN 9 can receive a request for an MPS invocation/revocation for a user in bearer level/control plane signaling, for example, over Iu interface from a control element of a radio access network. The Iu interface is between a radio network controller (RNC) and the core network (SGSN 9) and can provide signalling means to establish, maintain and release links, and recover fault situations and generic bearer services over its user plane. Based on the received MPS invocation/revocation, the SGSN 9 can transmit a corresponding request to the HSS/SPR 3.

Figure 4:
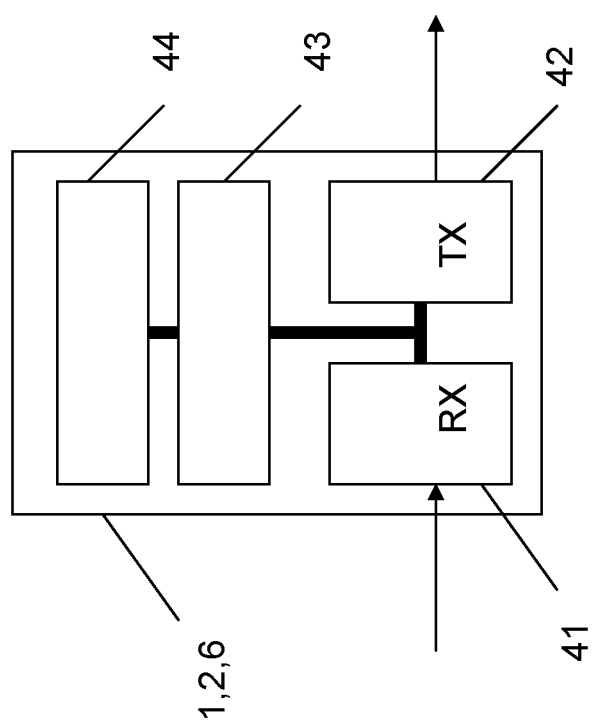
FIG. 4 illustrates example of internal structure and functions of apparatus implementing aspects of the invention.

FIG. 4 illustrates example of internal structure and functions of apparatus implementing aspects of the invention. The apparatus can have a receiver unit 41 configured to receive a control information, for example an invocation or revocation (i.e. activation/inactivation) request from a user for a multimedia priority service, in a signaling message according to a first protocol. The first protocol can be, for example, SIP (when the apparatus is, for example, an AF 6 and/or a P-CSCF 6) or Diameter (when the apparatus is, for example, a PCRF 2) or a packet bearer control protocol, for example, mobile radio layer 3 protocol or GPRS tunneling protocol (GTP) (when the apparatus is, for example, a packet data gateway 1), or Diameter, lightweight directory access protocol (LDAP), simple object access protocol (SOAP) or remote authentication dial-in user service (RADIUS) (when the apparatus is, for example, an SRP). The control information according to the first protocol can be received over Iu interface, if the apparatus is, for example, an SGSN 9, or over S1-MME interface, if the apparatus is, for example, an MME 8.

The apparatus can have a transmitter unit 42 configured to transmit a control information, for example an invocation or revocation request from a user for a multimedia priority service, in a signaling message according to a second protocol. The second protocol can be, for example, Diameter (when the apparatus is, for example, an AF 6, a P-CSCF 6, MME 8, SGSN 9 or a packet data gateway 1) or Diameter, LDAP, SOAP or RADIUS (when the apparatus is, for example, a PCRF).

The apparatus can have a processor unit 43 configured to process signalling between network elements and which can be, for example, configured to convert the received control information according to the first protocol into corresponding control information according to the second protocol. According to an aspect of the invention, the processor unit 43 can be configured to convert and/or map a received SIP MPS invocation/revocation indication from UE 4 into Diameter MPS invocation/revocation indication for a PCRF 2. According to an aspect of the invention, the processor unit 43 can be configured to convert and/or map a received Diameter MPS invocation/revocation indication from a PGW 1 or an AF/P-CSCF 6 into an MPS invocation/revocation indication according to LDAP, SOAP, RADIUS or Diameter for a SRP 3.

The apparatus can have a memory unit 44 configured to store information relating to a session and/or a user, for example, policy and charging control rules and/or multimedia priority service related information and parameters. The processor unit 43 can be configured to check, based on the information stored in the memory unit 44, if a user requesting invocation/revocation of the MPS is entitled and/or authorized to use MPS service (as explained before, an authority/operator can decide which users can received priority treatment to network resources). If the user does not have right to MPS priority service based on subscription data of the user, the processor unit 43 can deny activation of the MPS and can reject the request or proceed as the request was a normal (non-MPS) request.

The processor unit 43 can be configured to obtain information from the memory unit 44 and can initiate transmitting a response message which can include information from the memory unit 44 as response to signaling messages received by the receiver unit 41.

All units described above in relation to FIG. 4 may be implemented for example using microprocessors, chips and/or other electrical components and/or by software.

An apparatus implementing aspects of the invention may be physically implemented in a switch, router, server or other hardware platform or electronic equipment which can support data transmission and processing tasks, or can be implemented as a component of other existing device.

According to an aspect on the invention, a new parameter or new parameter values to some existing parameter can be implemented in one or more of mobile radio layer 3, GTP, SIP, Diameter, LDAP, SOAP and/or RADIUS protocols, or any other access technology specific protocol for example according to the access technologies listed hereinafter, to transmit an indication to invoke and/or revoke a multimedia priority service for a user.

For the purpose of the present invention as described herein above, it should be noted that an access technology via which signaling is transferred to and from a network element or node may be any technology by means of which a node can access an access network (e.g. via a base station or generally an access node). Any present or future technology, such as WLAN (Wireless Local Access Network), WiMAX (Worldwide Interoperability for Microwave Access), BlueTooth, Infrared, and the like may be used; although the above technologies are mostly wireless access technologies, e.g. in different radio spectra, access technology in the sense of the present invention implies also wirebound technologies, e.g. IP based access technologies like cable networks or fixed lines but also circuit switched access technologies; access technologies may be distinguishable in at least two categories or access domains such as packet switched and circuit switched, but the existence of more than two access domains does not impede the invention being applied thereto, usable access networks may be any device, apparatus, unit or means by which a station, entity or other user equipment may connect to and/or utilize services offered by the access network; such services include, among others, data and/or (audio-) visual communication, data download etc.;

a user equipment may be any device, apparatus, unit or means by which a system user or subscriber may experience services from an access network, such as a mobile phone, personal digital assistant PDA, or computer;

method steps likely to be implemented as software code portions and being run using a processor at a network element or terminal (as examples of devices, apparatuses and/or modules thereof, or as examples of entities including apparatuses and/or modules therefor), are software code independent and can be specified using any known or future developed programming language as long as the functionality defined by the method steps is preserved;

generally, any method step is suitable to be implemented as software or by hardware without changing the idea of the invention in terms of the functionality implemented;

method steps and/or devices, apparatuses, units or means likely to be implemented as hardware components at a terminal or network element, or any module(s) thereof, are hardware independent and can be implemented using any known or future developed hardware technology or any hybrids of these, such as MOS (Metal Oxide Semiconductor), CMOS (Complementary MOS), BiMOS (Bipolar MOS), BiCMOS (Bipolar CMOS), ECL (Emitter Coupled Logic), TTL (Transistor-Transistor Logic), etc., using for example ASIC (Application Specific IC (Integrated Circuit)) components, FPGA (Field-programmable Gate Arrays) components, CPLD (Complex Programmable Logic Device) components or DSP (Digital Signal Processor) components; in addition, any method steps and/or devices, units or means likely to be implemented as software components may for example be based on any security architecture capable e.g. of authentication, authorization, keying and/or traffic protection;

devices, apparatuses, units or means can be implemented as individual devices, apparatuses, units or means, but this does not exclude that they are implemented in a distributed fashion throughout the system, as long as the functionality of the device, apparatus, unit or means is preserved, an apparatus may be represented by a semiconductor chip, a chipset, or a (hardware) module comprising such chip or chipset; this, however, does not exclude the possibility that a functionality of an apparatus or module, instead of being hardware implemented, be implemented as software in a (software) module such as a computer program or a computer program product comprising executable software code portions for execution/being run on a processor;

a device may be regarded as an apparatus or as an assembly of more than one apparatus, whether functionally in cooperation with each other or functionally independently of each other but in a same device housing, for example.

The invention is not limited to controlling a multimedia priority service, but may also be applied in other type of networks having similar kind of subscription repository entity able to store information for controlling priority access to services. Functions of the AF, P-GW, PCRF, MME, SGSN and SPR described above may be implemented by code means, as software, and loaded into memory of a computer.

The invention claimed is:

1. An apparatus, comprising:
   at least one processor; and
   at least one memory including computer program code,
   the at least one memory and the computer program code are configured, with the at least one processor, to cause the apparatus at least to:
   transmit a request to control a multimedia priority service for a user, wherein the request to control comprises a request to activate or inactivate the multimedia priority service for the user,
   wherein the transmitting comprises transmitting the request in an activation or deactivation message,
   wherein at least one subscription-related multimedia priority service parameter is pre-configured in a subscription profile repository,
   wherein the transmitting comprises checking if the user is authorized for the multimedia priority service, and
   wherein the request comprises a request to activate or inactivate the multimedia priority service at the subscription profile repository.

2. The apparatus of claim 1, wherein the apparatus comprises a user equipment.

3. An apparatus, comprising:
   at least one processor; and
   at least one memory and the computer program code,
   the at least one memory and the computer program code are configured, with the at least one processor, to cause the apparatus at least to:
   receive from a user a first request to control a multimedia priority service; and
   transmit to a policy and/or charging control function a second request to control the multimedia priority service for the user,
   wherein the first request and the second request to control comprise a request to activate or inactivate the multimedia priority service for the user, and
   wherein the receiving comprises receiving the first request in an activation or deactivation message,
   wherein at least one subscription-related multimedia priority service parameter is pre-configured in a subscription profile repository, and
   wherein the first request comprises a request to activate or inactivate the multimedia priority service at the subscription profile repository.

4. The apparatus of claim 3, wherein the at least one memory and the computer program code are configured, with the at least one processor, to cause the apparatus at least to:
   convert the first request to the second request, and/or, wherein the transmitting comprises transmitting the second request in a Diameter message.

5. The apparatus of claim 3, wherein the apparatus further comprises at least one of a proxy call state control function, an application function, or a packet data gateway.

6. An apparatus, comprising:
   at least one processor; and
   at least one memory including computer program code,
   the at least one memory and the computer program code are configured, with the at least one processor, to cause the apparatus at least to:
   receive a first request to control a multimedia priority service for a user, wherein the receiving comprises receiving the first request in an activation or deactivation message; and
   transmit to a subscription profile repository a second request to control the multimedia priority service for the user,
   wherein the first request and the second request to control comprise a request to activate or inactivate the multimedia priority service for the user,
   wherein at least one subscription-related multimedia priority service parameter is pre-configured in the subscription profile repository, and
   wherein the first request comprises a request to activate or inactivate the multimedia priority service at the subscription profile repository.

7. The apparatus of claim 6, wherein the receiving comprises receiving the request from a packet data gateway.

8. The apparatus of claim 6, wherein the receiving comprises receiving according to Diameter protocol.

9. The apparatus of claim 6, wherein the apparatus comprises at least one of a policy control function or a charging control function.

10. The apparatus of claim 6, wherein the at least one memory and the computer program code are configured, with the at least one processor, to cause the apparatus at least to convert the first request to the second request.

11. The apparatus of claim 6, wherein the transmitting comprises transmitting the second request in a message according to one of a Diameter protocol, a lightweight directory access protocol (LDAP), a simple object access protocol (SOAP), or a remote authentication dial-in user service (RADIUS).

12. A method of transmitting a request to control a multimedia priority service for a user from user equipment to a subscription profile repository, comprising:
    transmitting the request from the user equipment to at least one of a policy control function or a charging control function via an intermediate node; and
    transmitting the request from the at least one of the policy control function or the charging control function to a subscription profile repository,
    wherein the request is transmitted from the user equipment to the intermediate node in an activation or deactivation message, and the intermediate node comprises a packet data gateway,
    wherein at least one subscription-related multimedia priority service parameter is pre-configured in the subscription profile repository,
    wherein the transmitting the request from the user equipment comprises checking if the user is authorized for the multimedia priority service, and
    wherein the request comprises a request to activate or inactivate the multimedia priority service at the subscription profile repository.

13. The method of claim 12, wherein the request is transmitted from the intermediate node to at least one of the policy control function or charging control function in a Diameter request.

14. The method of claim 12 wherein the request is transmitted from at least one of the policy control function or the charging control function to the subscription profile repository in a profile request for the user.

15. A method, comprising:
    receiving a first request, according to a first protocol, to control a multimedia priority service for a user, wherein the receiving comprises receiving the first request in an activation or deactivation message; and
    transmitting a second request, according to a second protocol, to control the multimedia priority service for the user,
    wherein the first request and the second request to control comprise a request to activate or inactivate the multimedia priority service for the user,
    wherein at least one subscription related multimedia priority service parameter is pre-configured in a subscription profile repository, and
    wherein the first request comprises a request to activate or inactivate the multimedia priority service at the subscription profile repository.

16. A computer program product, embodied on a non-transitory computer readable medium, the computer program product configured to control a processor to perform the method of claim 12.

17. An apparatus, comprising:
    at least one processor; and
    at least one memory including computer program code,
    the at least one memory and the computer program code configured, with the at least one processor, to cause the apparatus at least to
    receive a first request to control a multimedia priority service for a user; and
    transmit to a subscription server a second request to control the multimedia priority service for the user,
    wherein the first request and the second request to control comprise a request to activate or inactivate the multimedia priority service for the user,
    wherein the first request is received over S1-MME or Iu signaling interface and/or wherein the second request is transmitted over S6a or S6d signaling interface,
    wherein at least one subscription-related multimedia priority service parameter is pre-configured in a subscription server, and
    wherein the first request comprises a request to activate or inactivate the multimedia priority service at the subscription server.

18. The apparatus of claim 17, wherein the apparatus further comprises at least one of a mobility management entity, a serving GPRS support node, or wherein the subscription server comprises at least one of a home subscriber server or a subscription profile repository.

* * * * *